July 3, 1928.
A. W. CHESTERTON
PACKING
Original Filed Dec. 4, 1924
1,675,923
Fig.1.
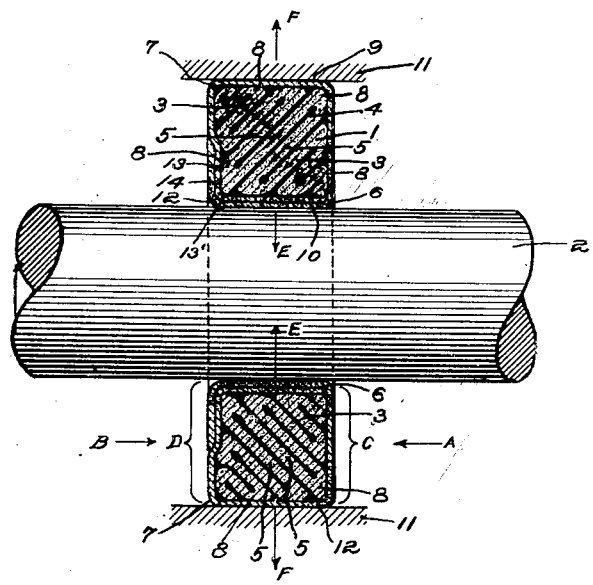
Fig.2.
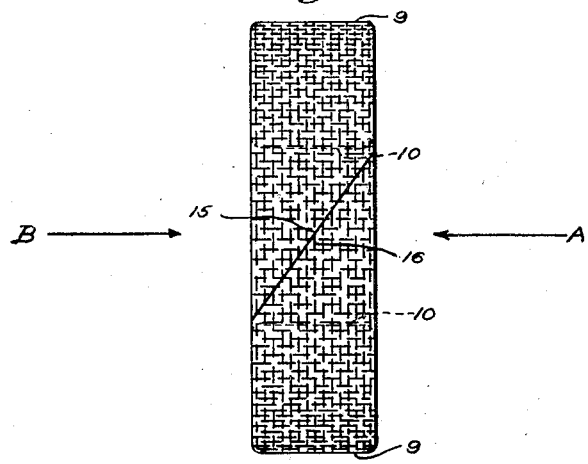
Fig.3.
Inventor:
Arthur W. Chesterton.
by Emery, Booth, Janney & Varney
Attys.

Patented July 3, 1928.

1,675,923

UNITED STATES PATENT OFFICE.

ARTHUR W. CHESTERTON, OF BROOKLINE, MASSACHUSETTS.

PACKING.

Application filed December 4, 1924, Serial No. 753,863. Renewed May 8, 1928.

This invention relates to improvements in packing and it is among the objects of the invention to provide a packing of superior durability and efficiency.

In the accompanying drawings which show merely for illustrative purposes one embodiment of my invention:—

Fig. 1 is a section of my packing in the form of a ring applied to a shaft or piston;

Fig. 2 is a detail edge view of the packing ring;

Fig. 3 is a cross section of a modified form of packing body.

While my invention may be applied to a large number and variety of uses I have, for convenience, shown it as applied in the form of a packing for piston rods or reciprocating shafts and the like but it is distinctly to be understood that the invention is not limited to this application.

In the drawings, referring particularly to Fig. 1, a packing body 1 is shown in ring form surrounding a shaft, for example, a piston rod 2. In cross section, said body 1 is rectangular, desirably substantially square, and consists of a number of layers 3, preferably of fibrous material such as woven asbestos cloth generally employed for such purposes. The several layers 3 of fabric are desirably parallel and prior to their arrangement in this form they are treated with suitable adhesive material or frictioned by a coating of rubber that is retained in its tacky or partially cured state, at least until the layers are arranged in parallel or final form and pressed together so as to cause them to firmly adhere one to the other and form an elastic or resilient body. The rubber or frictioning material indicated at 4 slightly separates said layers of fabric permitting relative movements thereof transversely of the faces of said layers for effecting a wedging action hereinafter described.

Heretofore packing bodies have been made comprising obliquely disposed layers of fabric which, in some instances, have been separated by rubber or like resilient material, but the present invention involves, in addition to said obliquely arranged layers, the forming of said layers from sheet material in folds by doubling the material back and forth as desired to produce a packing body of the desired form. To best illustrate this, attention is called to Fig. 1 wherein the packing ring is shown square in cross section with the layers 3 of fabric extending substantially diagonally thereof. The diagonal of said square represents the major layer or layers 5 while successive layers gradually decrease in width from said major layers or what may more correctly be termed folds of fabric toward the corners 6 and 7 of the square intersected by a diagonal running perpendicular to that of the plane of the major fold 5.

By carefully folding these several layers, the marginal bends or loops 8 are caused to describe the several sides of the square and thereby produce frayless double edges. These edges are capable of a slight spreading action when pressure is applied to produce a more uniformly even surface than would otherwise be possible, particularly on the faces 9 and 10 of the ring, to engage the corresponding surfaces respectively of the shaft housing 11 and piston rod or shaft 2. Obviously the body constructed as described from a plurality of folds of suitable fabric treated to effect the adhering of one layer to an adjacent layer or layers, will, when properly compressed, provide the desired form and, when contained within the recess provided therefor, said layers retain indefinitely their proper relation without disintegration or separation. If desired the frictioning material may, within the scope and purpose of the invention, be omitted and thereby allow a freer relative movement between the several layers and, in some cases, allow greater compression of said layers where greater compressibility is desired.

To improve the appearance of the packing and provide a smooth outer surface therefor, a covering 12 is provided being composed preferably of the same material as the filling but frictioned upon the inside only. This covering 12 is wrapped around said body 1 and its edges 13 and 14 are overlapped. The latter preferably terminates in one of the faces of the ring against which pressure is applied as shown in Fig. 1 rather than upon the inner or outer circumference or cylindrical faces thereof that are relied upon to prevent leakage. Sufficient frictioning or adhesive material is provided upon the inner face of said covering to completely fill all spaces between said covering and the loops or bends connecting the folds comprising the body of the ring or packing. And, when finally cured and completed, a substantially solid mass of fabric and rubber or other resilient substance will be provided between the four walls of said covering 12.

It is obvious that the flap 13 may be terminated at the inner corner 13' but desirably it is extended across the inner face 10 of the packing ring so as to provide, with the flap 14, a more durable covering to withstand the wear to which this portion of the ring is subjected due to the reciprocations of the piston rod or shaft 11. And this wear as well as friction thereon may and preferably is reduced by treating at least that portion of the covering 12 which forms the wall 10 with hydrocarbons which considerably harden said portions of the covering and allow the shaft to work more freely therein.

The packing embodying this invention is desirably constructed in strips with the body portion 1 of the desired configuration such as in the form of the square shown in Fig. 1 and these strips are later cut in the required length and the ends appropriately abutted as, for example, on the oblique lines 15 and 16 indicated in Fig. 2 so as to produce a ring of the proper diameter whereupon, when pressure is applied, the severed ends will fit tightly together in an endless packing.

In practice the body 1 of the packing substantially fills the space between the housing 11 and the shaft 2 and pressure is applied to said packing generally in a direction parallel with the axis of the shaft as shown either by the arrow A or B. The face of the packing opposite that to which pressure is applied is forced into contact with a fixed abutment not shown and, because of the oblique arrangement of said layers, those upon one side of the major fold or layer 5 of the fabric indicated at C will have a wedging action upon the layers of fabric upon the opposite side of said fold 5 and represented at D. This causes resultant pressures in the direction of the arrows E and F in opposite directions and against the housing 11 and shaft 2, thereby tightly sealing the space between said housing and shaft and preventing leakage of fluid therethrough.

Desirably the forming of several sides of the packing body from the bends or loops 8 uniting adjacent layers of fabric is effected from a single sheet of material continuously folded back and forth upon itself from the major layer 5 down to the last layers forming the corners 6 and 7, successive folds being united integrally at these bends with adjacent ones which, as they approach said corners 6 and 7, gradually diminish in width according to the form of cross section desired but it is to be understood that the invention is not limited to this particular arrangement of the folds of the fabric and in Fig. 3 I have shown another arrangement of said folds.

This form embodies a packing body 17 composed of a series of U-shaped elements 18 having their closed ends or bends 19 aligning to form the side of the packing body. The loose or cut edges 20 of the fabric layers are inserted in similar but inverted U-shaped elements 21 disposed with their closed ends 22 coinciding with other faces of the packing body. The folds constituting the arms of said U-shaped elements are gradually decreased in width from the plane of one diagonal of the packing body toward the corners intersected by the other diagonal thereof. The fabric composing this form of packing may and preferably is likewise frictioned with rubber or other appropriate material to effect the adhering of the layers together when pressure is applied and also to fill the spaces 23 between the looped ends of adjacent fabric units. Also the spaces 24 between the inner faces of the loops and the ends of adjoining fabric units are filled by said frictioning material as are other spaces or interstices appearing in the fabric. This filling operation is effected by compressing the body of the packing following the folding or building up operations thereof. The structure thus formed may, in the modification shown in Fig. 3, be enwrapped by a covering 25 similar to the casing 12 of the previously described form and the whole treated as hereinbefore set forth.

By arranging the bends of doubled edges which unite the oblique folds of the filling so that they form the boundaries of the packing body, a very resilient bearing surface is produced that will readily conform to the abutting surface and, though subjected to constant and continued pressure, will wear away uniformly and very slowly, always maintaining a tight joint and this will be true even after the coverings 12 or 25 have been worn away.

While I have herein shown and described merely for illustrative purposes, specific embodiments of my invention and have disclosed and discussed in detail the constructions and arrangements incidental to such disclosures, it is distinctly to be understood that the invention is limited neither to the mere details or relative arrangement of the parts nor to the specific application herein shown but that extensive variations from the illustrations may be made without departing from the principles thereof.

Claims:

1. A packing for movable shafts and the like comprising a body composed of a series of layers of sheet material and a covering of sheet material for said body, said covering being doubled at the face thereof engaging said movable shaft and the sheet material constituting said doubled portion being stiffened to reduce friction between said packing and said shaft.

2. A packing for movable shafts and the like comprising a body composed of a series of layers of sheet material and a covering of sheet material for said body, said covering being doubled at the face thereof engaging said movable shaft and the sheet material constituting said doubled portion being treated with hydrocarbons to provide stiffness for reducing friction between said material and said shaft.

3. In a packing, in combination, a series of substantially parallel layers of sheet material arranged obliquely to the planes of forces tending to compress said packing, said layers being in integral pairs formed by folding lengthwise of the packing, with the folded edges thereof forming the faces of the body of said packing, the layers forming each of said integral pairs being separated to receive one layer of two similar but oppositely arranged pairs of layers.

4. A packing comprising in combination, a plurality of U-shaped sections of frictioned sheet material, the layers constituting each of said sections being separated to receive like layers of two corresponding oppositely arranged sections, and a covering of similar material enclosing said sections.

In testimony whereof, I have signed my name to this specification.

ARTHUR W. CHESTERTON.